(12) United States Patent
Hong

(10) Patent No.: US 12,096,407 B2
(45) Date of Patent: Sep. 17, 2024

(54) TIME DOMAIN CONFIGURATION METHOD, DEVICE, AND STORAGE MEDIA

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 409 days.

(21) Appl. No.: 17/611,531

(22) PCT Filed: May 14, 2019

(86) PCT No.: PCT/CN2019/086912
§ 371 (c)(1),
(2) Date: Nov. 15, 2021

(87) PCT Pub. No.: WO2020/227943
PCT Pub. Date: Nov. 19, 2020

(65) Prior Publication Data
US 2022/0240247 A1 Jul. 28, 2022

(51) Int. Cl.
*H04W 72/04* (2023.01)
*H04W 8/18* (2009.01)
*H04W 72/0446* (2023.01)
*H04W 88/06* (2009.01)

(52) U.S. Cl.
CPC ....... *H04W 72/0446* (2013.01); *H04W 8/183* (2013.01); *H04W 88/06* (2013.01)

(58) Field of Classification Search
CPC . H04W 72/0446; H04W 8/183; H04W 88/06; H04W 8/20; H04W 8/24; H04W 24/02; H04W 60/005; H04W 8/22; H04W 76/11; H04W 4/029
See application file for complete search history.

(56) References Cited

U.S. PATENT DOCUMENTS

| | | | |
|---|---|---|---|
| 2009/0203354 A1* | 8/2009 | Tanabe | H04W 8/183 455/411 |
| 2012/0149372 A1* | 6/2012 | Lee | H04W 4/029 455/435.1 |
| 2013/0148574 A1 | 6/2013 | Liu et al. | |

(Continued)

FOREIGN PATENT DOCUMENTS

| | | |
|---|---|---|
| CN | 102685793 A | 9/2012 |
| CN | 104115454 A | 10/2014 |

(Continued)

OTHER PUBLICATIONS

First Office Action issued to Indian Application No. 202127057978 dated Aug. 22, 2022 with partial translation, (6p).

(Continued)

*Primary Examiner* — Kiet Tang
(74) *Attorney, Agent, or Firm* — Arch & Lake LLP

(57) ABSTRACT

The present disclosure provides a time domain configuration method, which includes: obtaining, by a terminal, time domain configuration information from a first network registered by a first SIM card in the terminal. The time domain configuration information includes time domain information used by the terminal for operating in a second network registered by a second SIM card.

19 Claims, 13 Drawing Sheets

(56) References Cited

U.S. PATENT DOCUMENTS

| | | |
|---|---|---|
| 2013/0150018 A1 | 6/2013 | Su et al. |
| 2013/0303203 A1 | 11/2013 | Wang et al. |
| 2014/0220981 A1 | 8/2014 | Jheng et al. |
| 2015/0334578 A1 | 11/2015 | Movva et al. |
| 2017/0367085 A1 | 12/2017 | Chakraborty |
| 2019/0230718 A1* | 7/2019 | Miao .................... H04W 76/11 |

FOREIGN PATENT DOCUMENTS

| | | |
|---|---|---|
| CN | 104581666 A | 4/2015 |
| CN | 106130618 A | 11/2016 |
| CN | 106131815 A | 11/2016 |
| CN | 106455003 A | 2/2017 |
| CN | 106792628 A | 5/2017 |
| CN | 108093089 A | 5/2018 |
| CN | 108419290 A | 8/2018 |
| EP | 1858209 A1 | 11/2007 |

OTHER PUBLICATIONS

International Search Report of PCT/CN2019/086912 dated Feb. 27, 2020 with English translation, (4p).
First Office Action issued to Chinese Application No. 201980000849.X dated Aug. 4, 2021 with English translation (12p).
Extended European Search Report issued in Application No. 19928405.0 dated Dec. 9, 2022,(9p).

* cited by examiner

TIME DOMAIN CONFIGURATION METHOD, DEVICE, AND STORAGE MEDIA

CROSS-REFERENCE TO RELATED APPLICATION

This application is the U.S. national phase application of PCT Application No. PCT/CN2019/086912, filed May 14, 2019, the entire contents of which are incorporated herein by reference for all purposes.

TECHNICAL FIELD

The present disclosure relates to the field of communication technology, in particular to a time domain configuration method, device, and storage medium.

BACKGROUND

With the development of wireless communication technology, terminals installed with multiple Subscriber Identification Module (SIM) cards are becoming more and more widely used.

In the related art, when a terminal installed with multiple SIM cards carries out communication services in the network registered by one SIM card (hereinafter referred to as the current network), if it is necessary to access a network registered by another SIM card for operation of communication services, it usually carries out autonomous operation based on the terminal manufacturer's implementation. However, the autonomous operation of the terminal based on the terminal manufacturer's implementation is likely to lead to the wrong guidance by the network on the control algorithm for the terminal, or even lead to the failure of the wireless link and trigger the corresponding recovery mechanism thus disturbing the data statistics and related algorithms of the network.

SUMMARY

The present disclosure provides a time domain configuration method, device, and storage medium.

According to the first aspect of the embodiments, the present disclosure provides a time domain configuration method, which is applied to a terminal provided with a first SIM card and a second SIM card. The method includes: obtaining first time domain configuration information from a first network registered by the first SIM card. The first time domain configuration information comprises time domain information used by the terminal for operating in a second network registered by the second SIM card.

According to the second aspect of the embodiments, the present disclosure provides a time domain configuration method, which is applied to an operator network. The method includes: determining first time domain configuration information, where the first time domain configuration information comprises time domain information used by a terminal for operating in a second network registered by a second SIM card; and sending the first time domain configuration information.

According to the third aspect of the embodiments, the present disclosure provides a time domain configuration apparatus, which is applied to a terminal provided with a first SIM card and a second SIM card. The apparatus includes an obtaining unit, configured to obtain first time domain configuration information from a first network registered by the first SIM card. The first time domain configuration information comprises time domain information used by the terminal for operating in a second network registered by the second SIM card.

According to the fourth aspect of the embodiments, the present disclosure provides a time domain configuration apparatus, which is applied to an operator network. The apparatus includes a processing unit, configured to determine first time domain configuration information, where the first time domain configuration information comprises time domain information used by a terminal for operating in a second network registered by a second SIM card; and a sending unit, configured to send the first time domain configuration information.

According to the fifth aspect of the embodiments, the present disclosure provides a communication system, which includes the time domain configuration apparatus applied to the terminal in the third aspect above or in any part of the third aspect, and includes the time domain configuration apparatus applied to the operator network in the fourth aspect above or in any part of the fourth aspect.

According to the sixth aspect of the embodiments, the present disclosure provides a time domain configuration device, applied to a terminal, including:
a processor; and
a memory for storing executable instructions of the processor;
where the processor is configured to execute the time domain configuration method described in the first aspect above or in any part of the first aspect.

According to the seventh aspect of the embodiments, the present disclosure provides a non-transitory computer-readable storage medium, causing, when instructions stored in the storage medium are executed by a processor of a terminal, the terminal to implement the time domain configuration method as described in the first aspect above or in any part of the first aspect.

According to the eighth aspect of the embodiments, the present disclosure provides a time domain configuration device, applied to an operator network, including:
a processor; and
a memory for storing executable instructions of the processor;
where the processor is configured to execute the time domain configuration method described in the second aspect above or in any part of the second aspect.

According to the ninth aspect of the embodiments, the present disclosure provides a non-transitory computer-readable storage medium, causing, when instructions stored in the storage medium are executed by a processor of a network device in an operator network, the network device to implement the time domain configuration method as described in the second aspect above or in any part of the second aspect.

BRIEF DESCRIPTION OF THE DRAWINGS

The accompanying drawings herein are incorporated into and form part of the specification, illustrate embodiments consistent with the present disclosure, and are used in conjunction with the specification to explain the principles of the present disclosure.

DETAILED DESCRIPTION

Figure 1:
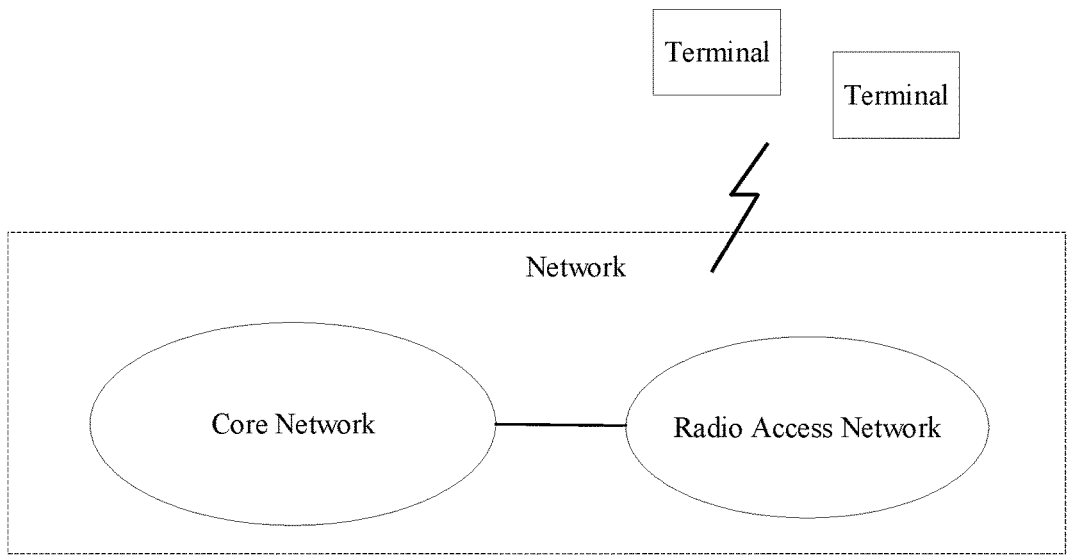
FIG. 1 illustrates a structural schematic diagram of a wireless communication system according to some embodiments.

Embodiments will be described herein in detail, examples of which are represented in the accompanying drawings. Unless otherwise indicated, the same numerals in the different accompanying figures indicate the same or similar elements where the description below relates to the accompanying figures. The embodiments described in the following embodiments do not represent all embodiments that are consistent with the present disclosure. Rather, they are only examples of devices and methods that are consistent with some aspects of the present disclosure, as detailed in the appended claims.

First, some of the terms involved in this disclosure are described so that they can be understood by those skilled in the art.

(1) Terminal, also known as User Equipment (UE), Mobile Station (MS), Mobile Terminal (MT), etc., is a device that provides voice and/or data connectivity to users. For example, the terminal can be a handheld device, a vehicle-mounted device, etc. with wireless connectivity. Currently, some examples of the terminal are: Mobile Phone, Pocket Personal Computer (PPC), handheld computer, Personal Digital Assistant (PDA), Laptop, Tablet PC, Wearable Device, or Car Device, etc.

Here, the terminal is provided with a communication card slot for installing a SIM card, and the number of such communication card slots may be one or more. The present disclosure is directed to a terminal provided with a plurality of communication card slots and installed with a plurality of SIM cards.

(2) SIM card, also known as Subscriber Identification Module (SIM) card, smart card, etc. SIM card stores information about the SIM card, which can include, for example, information for distinguishing the subscribers, encryption keys, and the subscriber's phone book. For example, the International Mobile Subscriber Identification Number (IMSI) is stored in the SIM card to allow the network to perform identity authentication. The SIM card can be installed in the terminal and associated with the operator network to which the SIM belongs.

(3) Network may be a wireless network including a Radio Access Network (RAN) as well as a Core Network (CN). There is a network device in the network, which can be, for example, a wireless access network node, core network device, etc. The radio access network node can also be called a base station. The network can provide network services for terminals through network devices, and different operators can provide different network services for terminals, which can also be understood as different operators correspond to different operator networks.

The terms "operator network," "network," and "system" are sometimes used interchangeably in this disclosure, but those of skill in the art can understand their meaning.

(4) "Multiple" refers to two or more, and other quantifiers are similar to it. "And/or", describing the relationship between the associated objects, indicates that there can be three relationships, for example, "A and/or B" can indicate three cases, i.e., the existence of A alone, the existence of both A and B, the existence of B alone. The character "/" generally indicates an "or" relationship between the associated objects before and after it. The singular forms "a", "said" and "the" are also intended to include plural forms, unless the context clearly indicates otherwise.

(5) The terms "first", "second", etc. are used to describe various types of information, but such information should not be limited to these terms. These terms are used only to distinguish the same type of information from each other, and do not indicate a specific order or level of importance. In fact, the expressions "first" and "second" can be used interchangeably. For example, without departing from the scope of this disclosure, first information may also be referred to as second information, and similarly, second information may also be referred to as first information.

The present disclosure provides a time domain configuration method that can be applied to the wireless communication system shown in FIG. 1. As shown in FIG. 1, a terminal accesses a Core Network (CN) through a Radio Access Network (RAN) for various communication services.

A wireless communication system, as can be understood, is a network that provides wireless communication functions. There are different communication technologies can be used in the wireless communication system, such as code division multiple access (CDMA), wideband code division multiple access (WCDMA), time division multiple access (TDMA), frequency division multiple access (FDMA), orthogonal frequency-division multiple access (OFDMA), single Carrier FDMA (SC-FDMA), and Carrier Sense Multiple Access with Collision Avoidance (CSMA/CA). Depending on the capacity, rate, and delay of different networks, the network can be classified as 2 generation (2G) network, a 3G network, a 4G network, or a future evolutionary network such as a 5G network. The 5G network can also be called a New Radio (NR) network. For the convenience of description, this disclosure sometimes refers to the wireless communication network simply as a network.

A plurality of terminals may be included in the wireless communication system shown in FIG. 1. The present disclosure is applicable to a scenario in which a terminal provided with multiple SIM cards communicates with a network.

In the present disclosure, any two different SIM cards among the plurality of SIM cards installed in the terminal are referred to as the first SIM card and the second SIM card for the convenience of description. The network registered by the first SIM card is called the first network, and the network registered by the second SIM card is called the second network.

In the related art, when the terminal carries out the communication services in the first network registered by the first SIM card, if it is necessary to perform the operation of the communication services in the second network registered by the second SIM card, the terminal will autonomously determine to access the second network registered by the second SIM card for operation and change the communication status, such as automatically disconnecting the communication connection with the first network. For example, the operation of the communication services performed by the terminal in the second network registered by the second SIM card, may be reading paging messages of the second network, measuring the frequency guide signal of the second network, reading system information about the second network, and/or performing Tracking Area Update (TAU). Disconnecting the communication with the first network can be understood as disconnecting the Radio Resource Control (RRC) connection with the first network and interrupting the communication service currently taking place on the first network. However, it is possible for the first network to continue paging the terminal after the terminal has disconnected from the first network, resulting in a waste of system resources. Moreover, when the terminal disconnects from the first network to perform an operation in the second network, a short interval, a long interval or a longer interval may be generated in the first network. For example, when the terminal autonomously determines to access the second network to read paging or perform measurement, it will result in a short interval of about 20 ms in the first network, which is similar to experiencing shadow fading for the first network, but since this happens once per paging period, it may affect the power control and link adaptive algorithm of the network, thus causing a waste of resources in the first network. As another example, when the terminal autonomously determines to switch to the cell of the second network, it needs to read the system information in the second network, which can cause a long interval of about 1 second in the first network, and the first network will consider this as an error situation. As yet another example, when the terminal autonomously determines to perform TAU in the second network, it will cause a longer interval of several seconds in the first network. In summary, when the terminal autonomously determines to perform the operation in the second network registered by the second SIM card and change the communication status, it is likely to cause the first network to respond incorrectly to the communication status of the terminal, such as continuous paging, considering a short interval as a problem on the wireless side, and considering a long interval as an error situation. This will lead to misguidance of the control algorithm of the first network for that terminal, and may even lead to failure of the wireless link and trigger the corresponding recovery mechanism, disrupting the data statistics and related algorithms of the first network.

In view of the above, the present disclosure provides a time domain configuration method. In the method, the network determines and sends time domain configuration information, where the time domain configuration information includes time domain information used by the terminal for operating in the second network registered by the second SIM card; and the terminal obtains the time domain configuration information from the network. For example, if there is a need to perform the operation of the communication services in the second network registered by the second SIM card when the terminal carries out the communication services in the first network registered by the first SIM card, then the terminal, based on the time domain configuration information sent by the first network, performs the operation of the communication services in the second network registered by the second SIM card. Since the time domain configuration information is determined by the first network and sent to the terminal, if the terminal performs the operation of communication services in the second network registered by the second SIM card based on the time domain configuration information sent by the network, the first network can clarify the current communication status of the terminal and thus avoid responding incorrectly to the communication status of the terminal.

Figure 2:
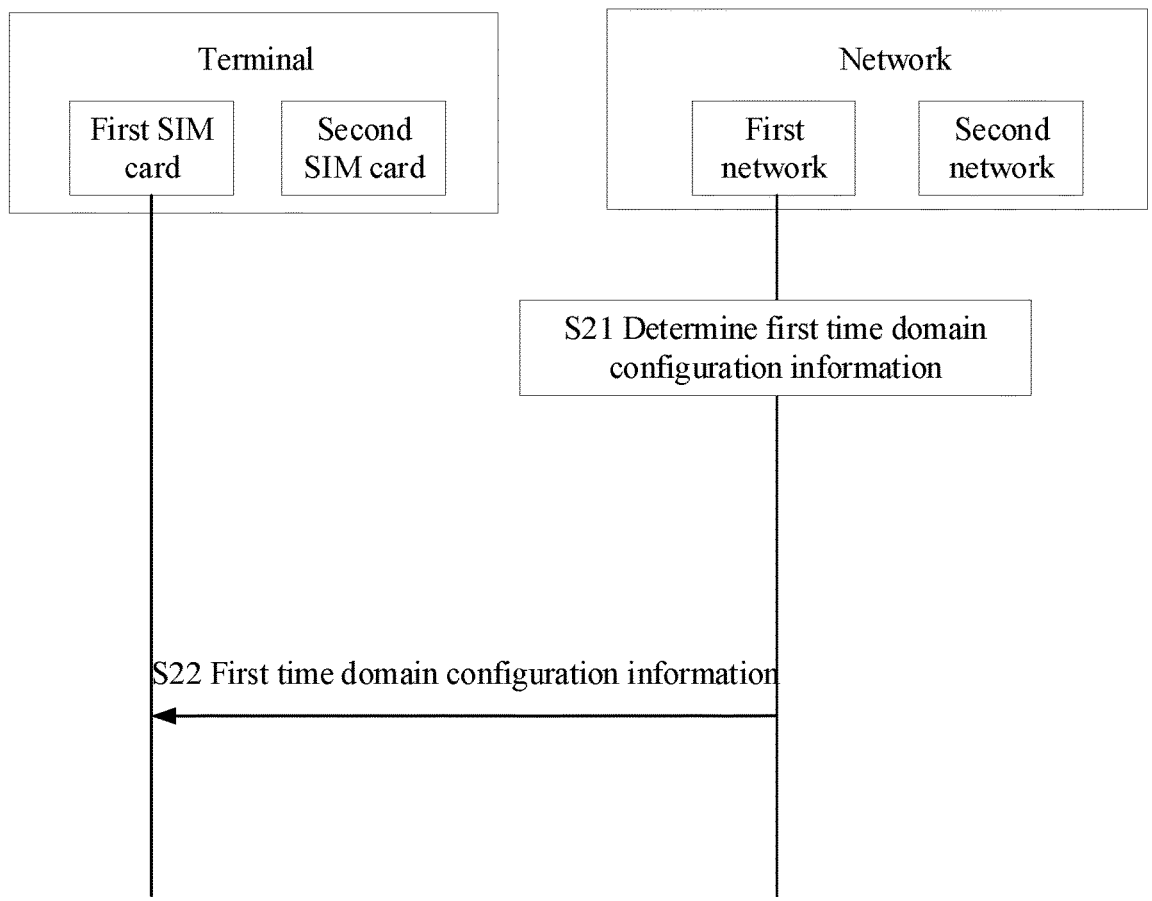
FIG. 2 illustrates a flowchart for sending a time domain configuration according to some embodiments.

FIG. 2 illustrates a flowchart of a time domain configuration method according to some embodiments. As shown in FIG. 2, the flow of the terminal interacting with the network to implement the time domain configuration method may include the following steps S21 and S22.

In step S21, the network determines first time domain configuration information.

In the present disclosure, the first time domain configuration information includes time domain information used by the terminal for operating in the second network registered by the second SIM card. For example, it may be the time when the terminal accesses the second network registered by the second SIM card for operation. For example, the network can configure the terminal to monitor the paging time of the second SIM card. Here, the time when the terminal accesses the second network registered by the second SIM card for operation includes a start time, a duration time, and/or an end time for the operation performed by the terminal in the second network registered by the second SIM card.

In step S22, the network sends the first time domain configuration information, and the terminal receives the first time domain configuration information from the network.

In the embodiments of the present disclosure, the terminal receives the first time domain configuration information sent by the network, and when it subsequently needs to access the second network registered by the second SIM card for operation of communication services, the terminal performs the operation of the communication services in the second network registered by the second SIM card based on the time domain configuration information sent by the first network. The first network can clarify the current communication status of the terminal, thereby avoiding wrong response to the communication status of the terminal.

In the embodiments of the present disclosure, the terminal sends the information about the SIM card installed on the terminal to the network, and then the network performs time domain configuration for the terminal based on the information about the SIM card and sends the time domain configuration information to the terminal.

Figure 3:
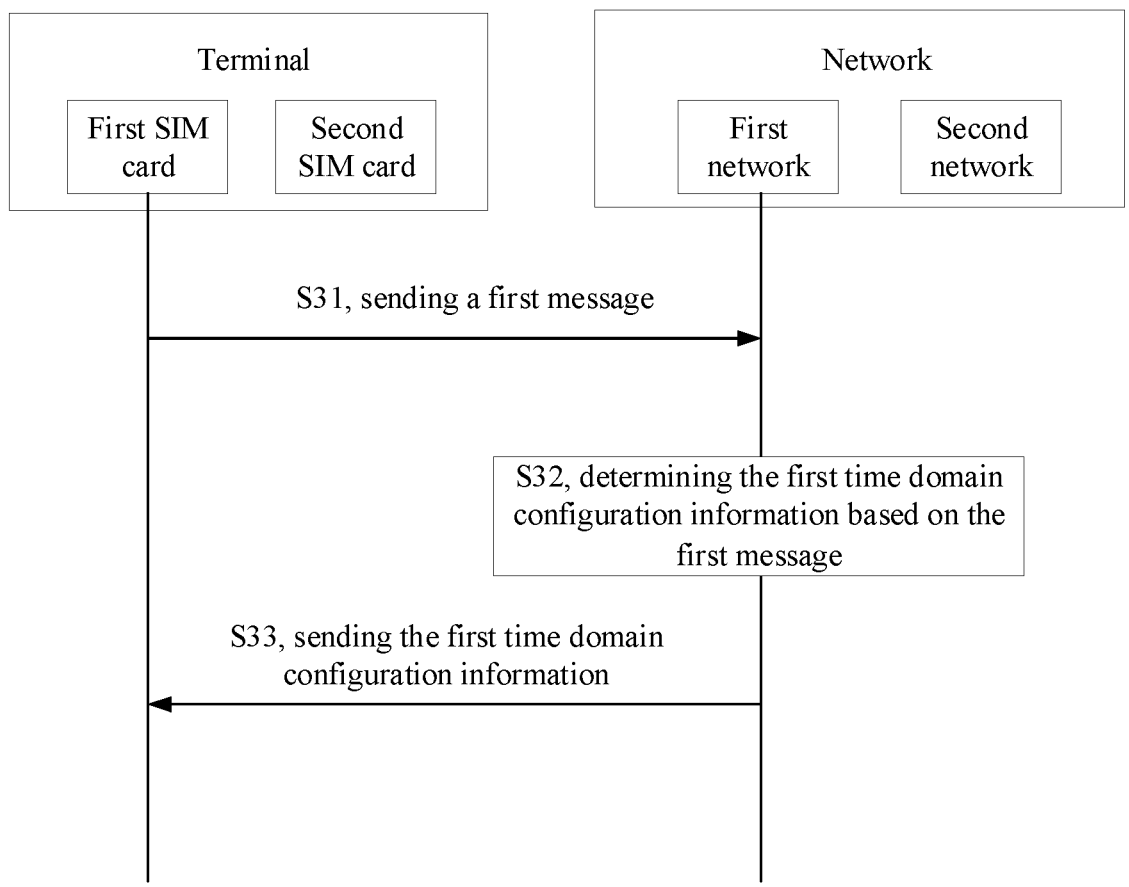
FIG. 3 illustrates another flowchart for sending a time domain configuration according to some embodiments.

FIG. 3 illustrates another flowchart of a time domain configuration method according to some embodiments. As shown in FIG. 3, the flow of the terminal interacting with the network to implement the time domain configuration method may include steps S31, S32, and S33.

In step S31, the terminal sends a first message to the first network registered by the first SIM card, and the first network receives the first message from the terminal.

In the present disclosure, the first message is used to inform the first network registered by the first SIM card installed in the terminal that the terminal is further provided with the second SIM card.

After receiving the first message, the first network can determine, based on this first message, that the terminal is further installed with a second SIM card in addition to the first SIM card, and perform a time domain configuration, through which the control of the operation performed by the terminal in the second network registered by the second SIM card is realized.

In step S32, the first network determines the first time domain configuration information based on the first message.

In the present disclosure, the first time domain configuration information, determined by the first network based on the first message, is used to instruct the terminal to perform the operation in the second network registered by the second SIM card based on the time domain information configured for the terminal by the first network. The first time domain configuration information may be the time domain information obtained by the first network after the first network performs the time domain configuration for the terminal based on the first message.

In step S33, the first network sends the first time domain configuration information determined based on the first message. The terminal receives the first time domain configuration information determined and sent by the first network based on the first message.

In the embodiments of the present disclosure, the first network sends the first time domain configuration information determined based on the first message to the terminal, and the terminal receives the first time domain configuration information. When it subsequently needs to access the second network registered by the second SIM card for operation of communication services, the terminal, based on the time domain configuration information sent by the first network, accesses the second network registered by the second SIM card for operation of communication services, and the first network can clarify the current communication status of the terminal, and thus avoid responding incorrectly to the communication status of the terminal.

The present disclosure will be illustrated below with examples of the above involved time domain configuration methods in the context of practical applications.

In the present disclosure, the terminal needs to request registration of all SIM cards installed in the terminal to the network before sending the first message to the network side for informing the network that other SIM cards are installed in the terminal. In this case, SIM card registration can be requested through each installed SIM card from the respective network after the terminal is turned on. For example, if there are SIM card 1 and SIM card 2 installed in the terminal, the terminal requests, via SIM card 1, registration of SIM card 1 from the operator's network 1 to which SIM card 1 belongs, and requests, via SIM card 2, registration of SIM card 2 from the operator's network 2 to which SIM card 2 belongs.

In step S31 of this disclosure, the terminal may autonomously select the first SIM card among the installed SIM cards, and send the first message to the first network registered by the first SIM card to inform the first network that the terminal is further provided with a second SIM card.

In the present disclosure, the terminal may select a SIM card as the first SIM card among the installed SIM cards. By selecting the SIM card, the terminal can inform the network registered by the selected SIM card that there is another SIM card installed in the terminal, so that the network registered by the selected SIM card is informed that another SIM card is installed in the terminal, and performs time domain configuration for the terminal to perform the operation in the network registered by the other SIM card. For example, if there are SIM card 1 and SIM card 2 installed in the terminal, the terminal may select SIM card 1 as the first SIM card and send, via SIM card 1, the first message to the operator network 1 registered by SIM card 1. The first message is used to inform the operator network 1 that the terminal is further provided with SIM card 2. The terminal may also select SIM card 2 as the first SIM card, and send, via SIM card 2, the first message to the operator network 2 registered by SIM card 2. The first message is used to inform the operator network 2 that the terminal is further provided with SIM card 1.

In the embodiments of the present disclosure, on the one hand, the terminal may select a SIM card as the first SIM card based on the terminal itself; for example, the terminal may set a designated communication card slot and use the SIM card installed in the designated communication card slot as the first SIM card. For example, if there are communication card slot 1 and communication card slot 2 provided in the terminal, and the communication card slot 1 of the terminal is considered as the designated communication card slot by default, the SIM card installed in the communication card slot 1 is taken as the first SIM card. On the other hand, the terminal may select a SIM card as the first SIM card based on the user; for example, the terminal may take the SIM card selected by the user as the first SIM card. For example, the terminal may take the SIM card, installed in the communication card slot selected by the user as the main network, as the first SIM card.

In the present disclosure, the number of second SIM cards may be one or more. For example, if there are SIM card 1, SIM card 2 and SIM card 3 installed in the terminal, the terminal may select SIM card 1 as the first SIM card and send the first message to the operator network 1 registered by SIM card 1. On the one hand, the first message may be used to inform the operator network 1 that the terminal is further provided with SIM card 2 or SIM card 3. On the other hand, the first message may also be used to inform the operator network 1 that the terminal is further provided with SIM card 2 and SIM card 3.

Furthermore, in the present disclosure, after receiving the first message from the first SIM card, the first network may send to the terminal a request message used for requesting information about the second SIM card. The terminal receives the request message from the first network, and sends the information about the second SIM card to the first network. The first network receives the information about the second SIM card from the terminal, and determines the first time domain configuration information based on the information about the second SIM card. Furthermore, after receiving the request message from the first network, the terminal may send the information about the second SIM card to the first network under the condition that it is determined receipt of permission from a user for allowing the information about the second SIM card to be sent to the first network, so as to achieve privacy protection of the second SIM card information.

Figure 4:
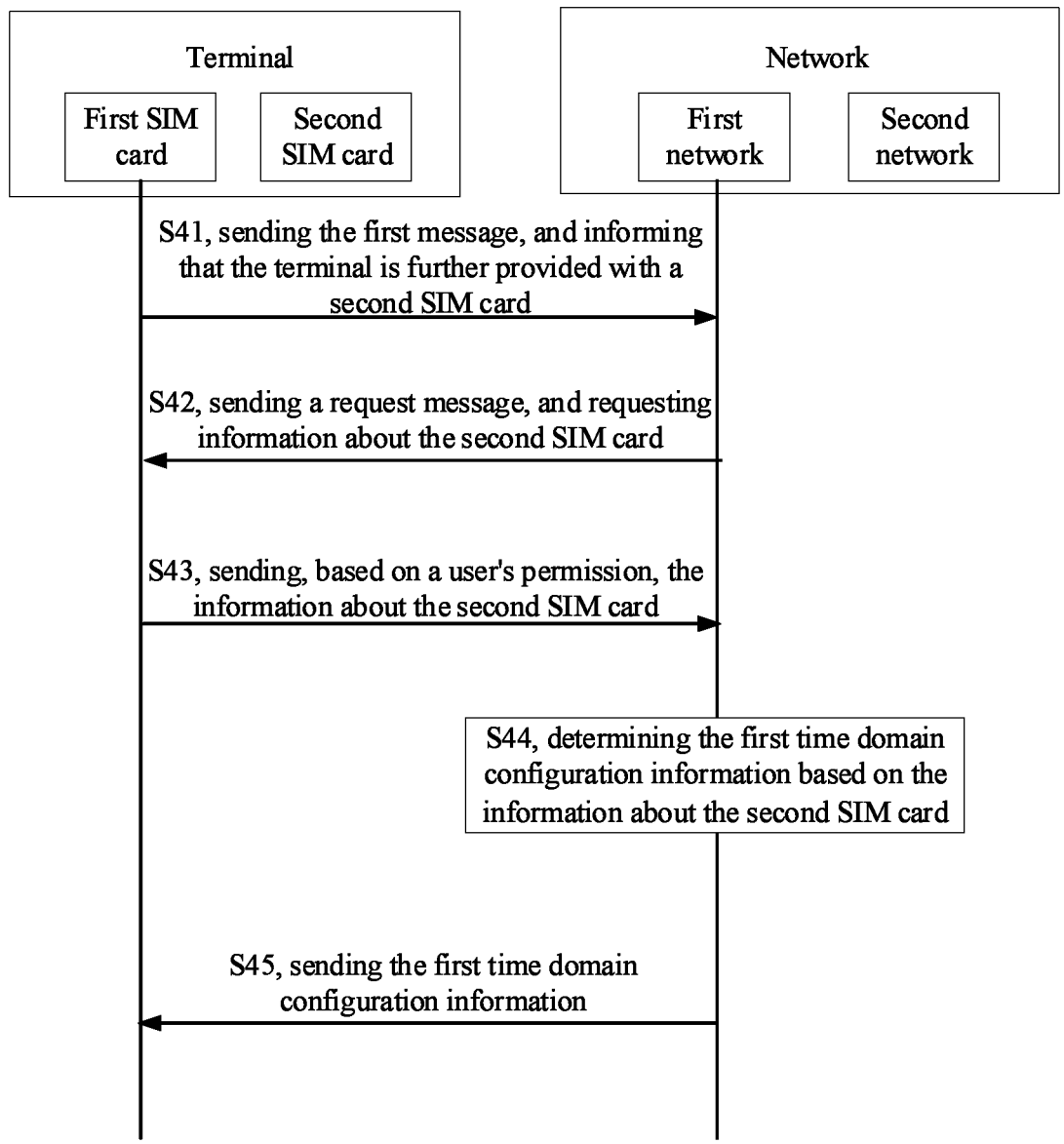
FIG. 4 illustrates yet another flowchart for sending a time domain configuration according to some embodiments.

FIG. 4 illustrates yet another flowchart of a time domain configuration method according to some embodiments. In the time domain configuration method shown in FIG. 4, steps S41 and S45 are the same as steps S31 and S33 in the method shown in FIG. 3, and will not be repeated here, and only the different steps are described below.

In step S42, the first network sends a request message to the terminal, and the request message is used to request information about the second SIM card. The terminal receives the request information from the first network.

In the present disclosure, the information about the second SIM card is related to the second SIM card informed by the first message sent from the terminal, that is, the first network in the present disclosure may send request massage to the terminal based on the first message. In the present disclosure, the information about the second SIM card may be identification information about the second SIM card, for example, it may be an International Mobile Subscriber Identity (IMSI).

In step S43, the terminal sends, based on a user's permission, the information about the second SIM card to the first network. The information about the second SIM card is used to determine the first time domain configuration information. The first network receives the information about the second SIM card from the terminal.

In the present disclosure, the user's permission may be pre-set or may be determined according to a selection made by the user on, for example, a prompt message sent to the user as to whether or not to allow the second SIM card information to be sent.

In step S44, the first network determines the first time domain configuration information based on the information about the second SIM card.

In the present disclosure, the information about the second SIM card may be received by the core network of the first network and time domain configuration may be performed for the terminal based on the information about the second SIM card. The first time domain configuration information, determined by the first network based on the information about the second SIM card information, may be, for example, the paging time at which the terminal is configured to monitor the second SIM card.

In the present disclosure, on the one hand, the first time domain configuration information may be determined by the first network directly based on the information about the second SIM card, and on the other hand, the first network can also negotiate with the second network registered by the second SIM card and determine the first time domain configuration information based on the negotiation result. The negotiation between the first network and the second network registered by the second SIM card in the present disclosure may be based on the pre-configured system information, or may be based on the processed services. Generally, the negotiation result can be predetermined by the negotiation between the first network and the second network registered by the second SIM card.

In the embodiments of the present disclosure, the terminal can select multiple SIM cards among the installed SIM cards, and send message to each network registered by each of the multiple SIM cards for informing that the terminal is provided with other SIM card(s). The multiple SIM cards may be all SIM cards. For example, SIM card 1, SIM card 2 and SIM card 3 are installed in the terminal, and the terminal may select SIM card 1 and send, via SIM card 1, a message to the operator network 1 registered by SIM card 1 for informing the operator network 1 that SIM card 2 and/or SIM card 3 are installed in the terminal. The terminal may also select SIM card 2 and send, via SIM card 2, a message to the operator network 2 registered by SIM card 2 for informing the operator network 2 that SIM card 1 and/or SIM card 3 is installed in the terminal.

In the embodiments of the present disclosure, the time domain configuration information may be determined separately by the respective networks registered by all SIM cards and sent to the terminal, and the terminal receives the time domain configuration information sent separately by the respective networks registered by all SIM cards. For example, the terminal may obtain the second time domain configuration information determined and sent by the second network. The second time domain configuration information includes the time domain information used by the terminal for operating in the first network registered by the first SIM card.

In the embodiments of the present disclosure, the terminal may inform separately to the respective networks registered by all the SIM cards that other SIM card(s) are further installed in the terminal. On the one hand, the terminal sends, via the second SIM card, a second message to the second network registered by the second SIM card, informs the second network registered by the second SIM card through the second message that the terminal is further provided with a first SIM card, and the terminal receives the second time domain configuration information determined and sent by the second network based on the second message.

Figure 5:
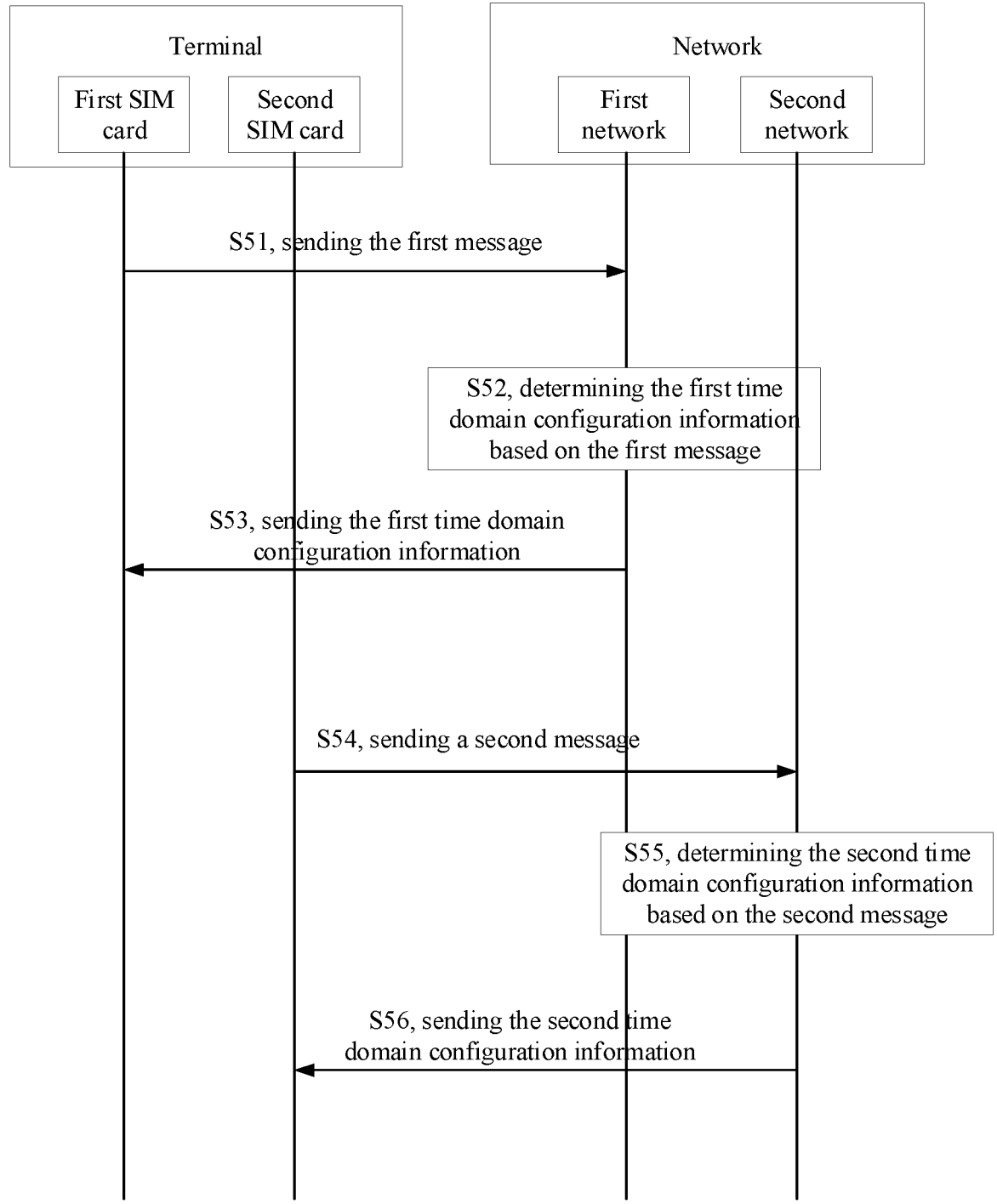
FIG. 5 illustrates yet another flowchart for sending a time domain configuration according to some embodiments.

FIG. 5 illustrates yet another flowchart of a time domain configuration method according to some embodiments. The flow of the time domain configuration method shown in FIG. 5 may be performed on the basis of the method flow shown in FIG. 2, may be performed on the basis of the method flow shown in FIG. 3, or may be performed on the basis of the method flow shown in FIG. 4. The present disclosure embodiment is illustrated by proceeding on the basis of the method flow shown in FIG. 3 as an example. Steps S51, step S52, and step S53 in the time domain configuration method flow shown in FIG. 5 are the same as steps S31, step S32, and step S33 in the method shown in FIG. 3, will not be repeated here, and only the different steps are described as follows.

In step S54, the terminal sends a second message to the second network registered by the second SIM card, and the second network receives the second message from the terminal.

In this disclosure, the second message is used to inform the second network registered by the second SIM card installed in the terminal that the terminal is further provided with a first SIM card.

In step S55, the second network determines the second time domain configuration information based on the second message.

In step S56, the second network sends the second time domain configuration information determined based on the second message. The terminal receives the second time domain configuration information determined and sent by the second network based on the second message.

In the embodiments of the present disclosure, the implementation process of sending the second message by the terminal is similar to the process of sending the first message described above. The implementation process, of determining and sending the second time domain configuration information by the second network based on the second message, is similar to the above-mentioned implementation process, of determining and sending the first time domain configuration information based on the first message. The implementation process, of receiving the second time domain configuration information by the terminal, is similar to the implementation process of receiving the first time domain configuration information as described above. The present disclosure will not be described in detail herein, and can be described with reference to the relevant embodiments described above.

In the embodiments of present disclosure, by sending the first message to the first network registered by the first SIM card and receiving the first time domain configuration information determined and sent by the first network based on the first message, and by sending the second message to the second network registered by the second SIM card via the second SIM card and receiving the second time domain configuration information determined and sent by the second network based on the second message, it is possible to inform the respective networks registered by all the SIM cards that other SIM card(s) are further installed in the terminal, so that when the terminal in the network registered by any SIM card needs to access the other network for operation, the network to which the terminal itself belongs will not respond incorrectly.

Furthermore, in the embodiments of present disclosure, if the terminal receives both the first time domain configuration information sent by the first network and the second time domain configuration information sent by the second network, the terminal may select, based on the network where the current service is performed, the time domain configuration information sent by the corresponding network for operation. For example, when there are services in progress at the terminal in the first network, if it needs to operate in the second network registered by the second SIM card, the first time domain configuration information sent by the first network is used for operating in the second network registered by the second SIM card. When there are services in progress at the terminal in the second network, if it needs to operate in the first network registered by the first SIM card, the second time domain configuration information sent by the second network is used for operating in the first network registered by the first SIM card.

Furthermore, in this disclosure, after receiving the second message sent by the second SIM card, the second network may send a request message to the terminal for requesting the information about the first SIM card. The terminal receives the request message from the second network and sends the information about the first SIM card to the second network. The second network receives the information about the first SIM card from the terminal and determines the second time domain configuration information based on the information about the first SIM card. Furthermore, after receiving the request message sent by the second network, the terminal may send the information about the first SIM card to the second network under the condition that it determines the receipt of the user's permission for allowing the first SIM card to be sent to the second network, so as to achieve privacy protection of the information about the second SIM card.

For the convenience of description in this disclosure, the request message sent by the first network for requesting the information about the second SIM card is referred to as the first request message, and the request message sent by the second network for requesting the information about the first SIM card is referred to as the second request message.

Furthermore, in this disclosure, in the case of sending the first message via the first SIM card and the second message via the second SIM card, the first request message can be sent by the first network to the terminal and the second request message can be sent by the second network to the terminal for the privacy protection of the information on the first SIM card and the second SIM card.

Figure 6:
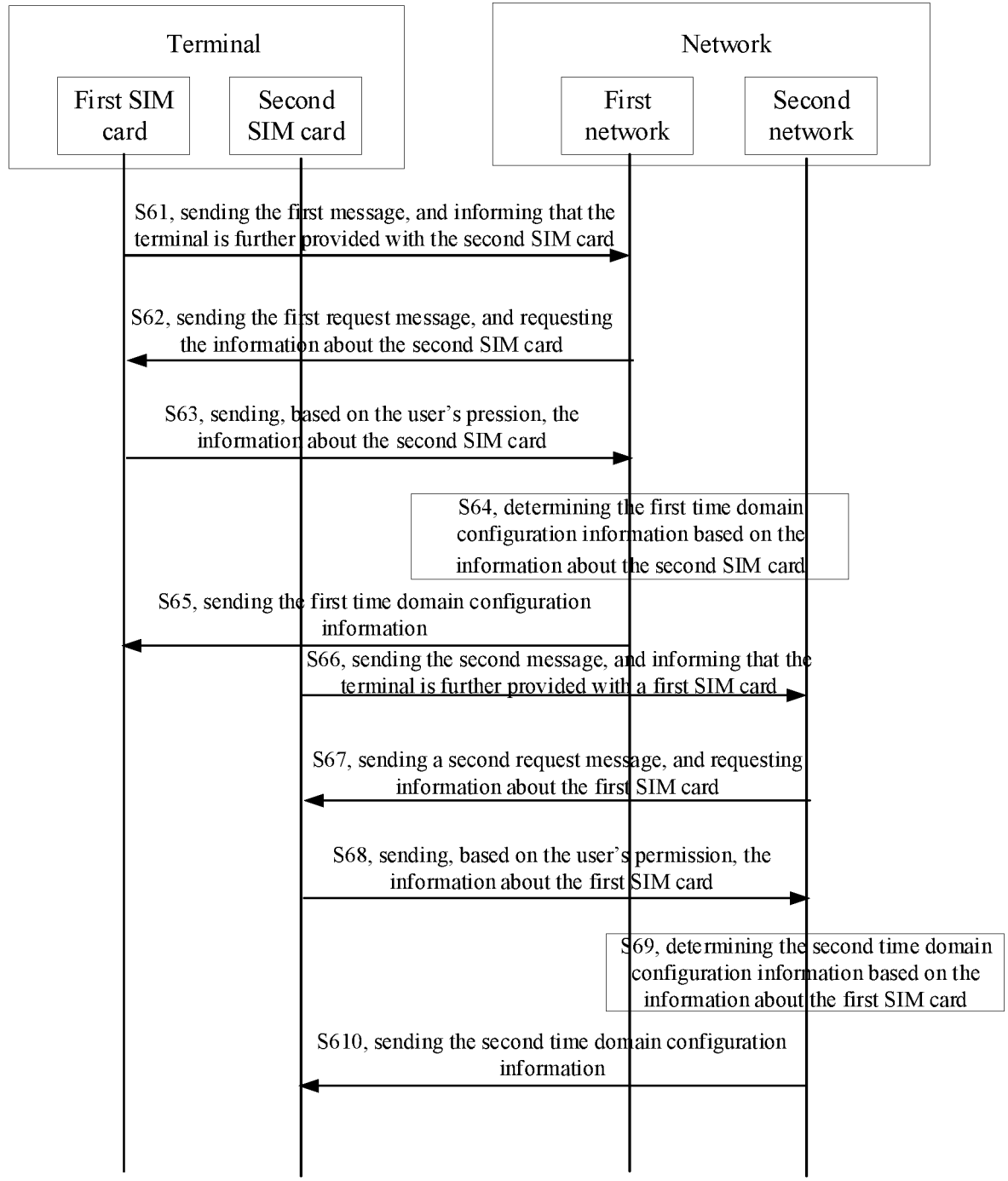
FIG. 6 illustrates yet another flowchart for sending a time domain configuration according to some embodiments.

FIG. 6 illustrates yet another flowchart of a time domain configuration method according to some embodiments. The flow of the time domain configuration method shown in FIG. 6 includes steps as follows.

In step S61, the terminal sends a first message to the first network registered by the first SIM card to inform the first network that the terminal is further provided with a second SIM card. The first network receives the first message from the terminal.

In step S62, the first network sends a first request message to the terminal, and the first request message is used to request for the information about the second SIM card. The terminal receives the first request message from the first network.

In step S63, the terminal sends, based on a user's permission, the information about the second SIM card to the first network, and the information about the second SIM card is used to determine the first time domain configuration information. The first network receives the information about the second SIM card from the terminal.

In step S64, the first network determines the first time domain configuration information based on the information about the second SIM card.

In step S65, the first network sends the first time domain configuration information determined based on the information about the second SIM card. The terminal receives the first time domain configuration information determined and sent by the first network based on the information about the second SIM card.

In step S66, the terminal sends a second message to the second network registered by the second SIM card to inform the second network that the terminal is further provided with the first SIM card. The second network receives the second message from the terminal.

In step S67, the second network sends a second request message to the terminal, and the second request message is used to request the information about the first SIM card. The terminal receives the second request message from the second network.

In step S68, the terminal sends, based on a user's permission, the information about the first SIM card to the second network. The information about the first SIM card is used to determine the second time domain configuration information. The second network receives the information about the first SIM card sent by the terminal.

In step S69, the second network determines the second time domain configuration information based on the information about the first SIM card.

In step S610, the second network sends the second time domain configuration information determined based on the information about the first SIM card. The terminal receives the second time domain configuration information determined and sent by the second network based on the information about the first SIM card.

In this disclosure, through the flow of the time domain configuration method shown in FIG. 6, it can be realized that when the terminal in the network registered by any SIM card needs to access other network(s) for operation, the network to which the terminal itself belongs will not respond incorrectly. And it is possible to protect the privacy of the information on the first SIM card and the second SIM card.

Furthermore, in above-mentioned embodiments of the present disclosure, after the terminal is turned on, registrations of the SIM cards may be requested by each installed SIM card to the respective network to which it belongs, so that the network may perform the authorization for the registered SIM card.

Figure 7:
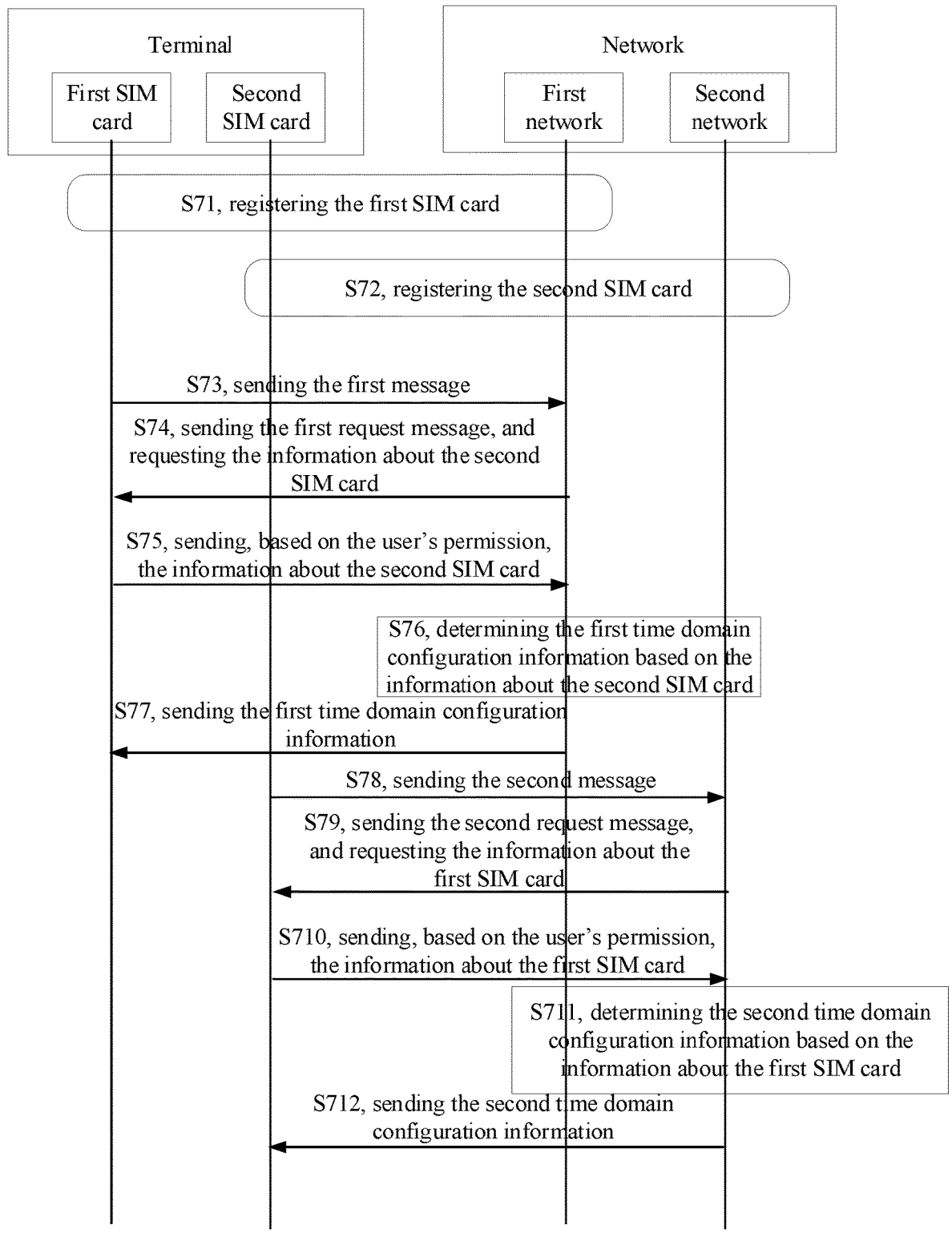
FIG. 7 illustrates yet another flowchart for sending a time domain configuration according to some embodiments.

FIG. 7 illustrates yet another flowchart of a time domain configuration method according to some embodiments. The flow of the time domain configuration method illustrated in FIG. 7 may be based on the time domain configuration method involved in any of FIGS. 2 to 6, in this case, a request is made to the first network to which the first SIM card belongs to register the first SIM card, and the first network registers the first SIM card; a request is made to the second network to which the second SIM card belongs to register the second SIM card, and the second network registers the second SIM card. The present disclosure is illustrated by proceeding on the basis of the time domain configuration method shown in FIG. 6 as an example. Steps S73 to step S712 in FIG. 7 are the same as steps S61 to step S610 in FIG. 6 and will not be repeated here, except that FIG. 7 also includes steps S71 and S72.

In step S71, the terminal requests a registration of the first SIM card to the first network via the first SIM card, and the first network registers the first SIM card.

In step S72, the terminal requests a registration of the second SIM card to the second SIM card via the second SIM card, and the second network registers the second SIM card.

Furthermore, based on the time domain configuration method provided in the above embodiments of the present disclosure, the operator network may respond to the communication status of the terminal based on the time domain configuration information sent to the terminal. For example, the first network may respond to the communication status between the terminal and the first network based on the first time domain configuration information sent to the terminal. The second network may respond to the communication status between the terminal and the second network based on the second time domain configuration information sent to the terminal. The response to the communication status of the terminal in the present disclosure may be understood as processing or not processing the operational of the terminal. For example, in the case where the first network responds to the communication status between the terminal and the first network based on the first time domain configuration information sent to the terminal, if the terminal disconnects the communication connection with the first network and accesses the second network for paging monitoring, the first network may interrupt the paging terminal to save paging resources.

The accompanying drawings related to the above embodiments of the present disclosure may also include implementation steps in which the first network responds to the communication status of the terminal based on the first time domain configuration information sent to the terminal, and/or the second network responds to the communication status of the terminal based on the second time domain configuration information sent to the terminal, which will not be illustrated herein.

Figure 8:
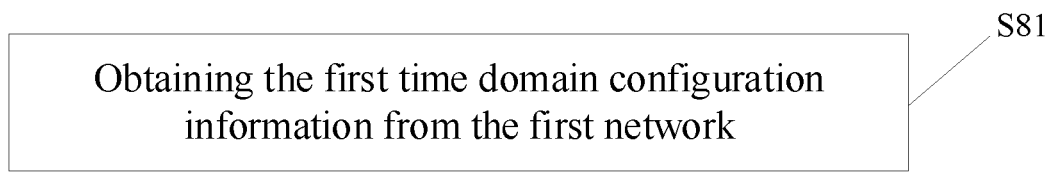
FIG. 8 illustrates yet another flowchart for sending a time domain configuration according to some embodiments.

FIG. 8 illustrates yet another flowchart of a time domain configuration method according to some embodiments. As shown in FIG. 8, the time domain configuration method is applied to the wireless communication system shown in FIG. 1 and performed by the terminal in FIG. 1, and which may include the following step S81.

In step S81, the first time domain configuration information, sent by the first network registered by the first SIM card, is obtained.

Here, the first time domain configuration information includes the time domain information used by the terminal for operating in the second network registered by the second SIM card.

Figure 9:
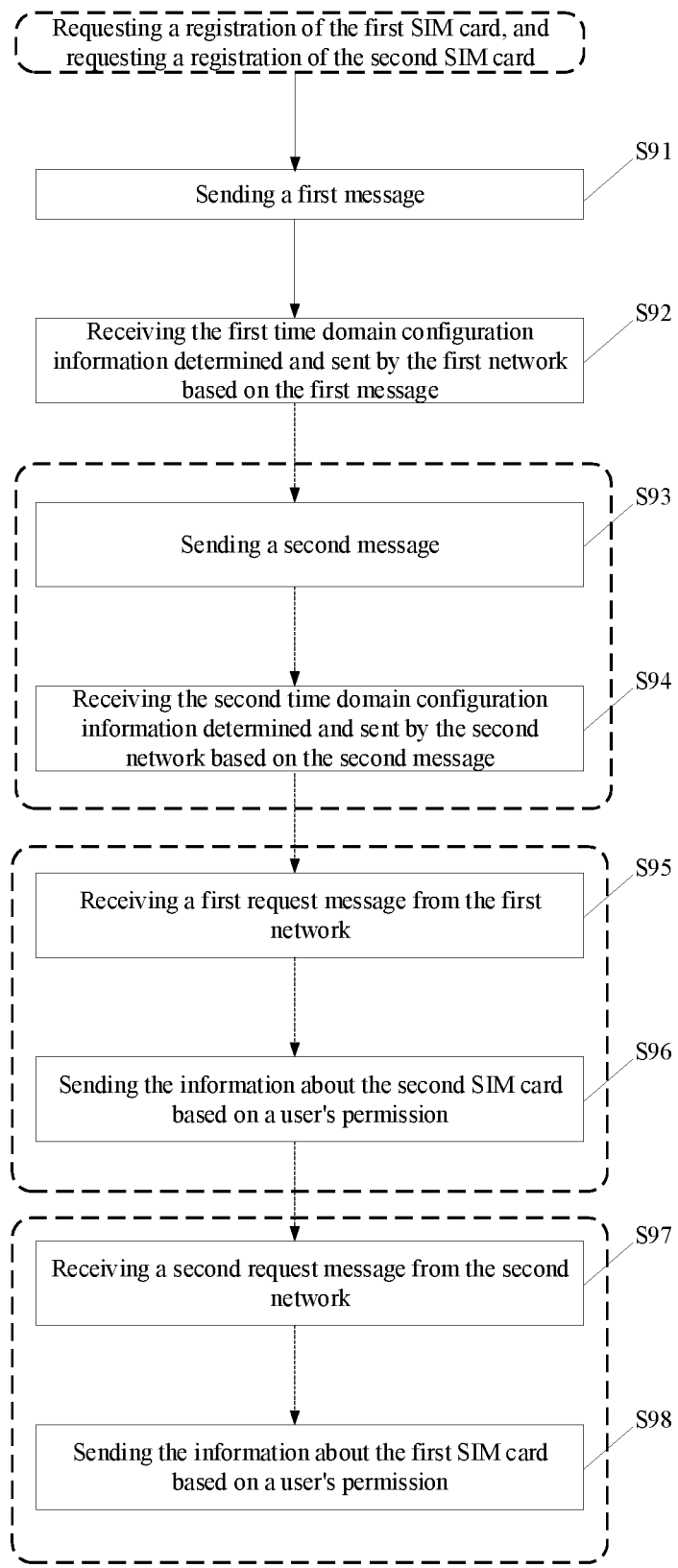
FIG. 9 illustrates yet another flowchart for sending a time domain configuration according to some embodiments.

FIG. 9 illustrates yet another flowchart of a time domain configuration method according to some embodiments. As shown in FIG. 9, the time domain configuration method is applied to the wireless communication system shown in FIG. 1 and performed by the terminal in FIG. 1, which may include the following steps S91 and S92.

In step S91, a first message is sent to the first network registered by the first SIM card.

In this disclosure, the first message is used to inform the first network registered by the first SIM card installed in the terminal that the terminal is further provided with a second SIM card.

In step S92, the first time domain configuration information, determined and sent by the first network based on the first message, is received.

Furthermore, the present disclosure may also include steps S93 and S94 as follows. Step S93 and step S94 are optional.

In step S93, a second message is sent to the second network registered by the second SIM card, and the second message is used to inform the second network that the terminal is further provided with a first SIM card.

In step S94, the second time domain configuration information, determined and sent by the second network based on the second message, is received.

In this disclosure, the first SIM card may be installed in a communication card slot designated by the terminal; or the first SIM card may be selected by the user.

Furthermore, the present disclosure may also include steps S95 and S96 as follows. Step S95 and step S96 are optional.

In step S95, a first request message is received from the first network, and the first request message is used to request information about the second SIM card.

In step S96, the information about the second SIM card is sent to the first network based on a user's permission, and the information about the second SIM card is used to determine the first time domain configuration information.

Here, the first time domain configuration information may be determined based on the result of the negotiation between the first network and the second network registered by the second SIM card.

Further, the present disclosure may also include step S97 and step S98 if both the first message is sent to the first network and the second message is sent to the second network. Step S97 and step S98 are optional.

In step S97, a second request message is received from the second network, and the second request message is used to request information about the first SIM card.

In step S98, the information about the first SIM card is sent to the second network based on a user's permission, and the information about the first SIM card is used to determine the second time domain configuration information.

Here, the first time domain configuration information and the second time domain configuration information are determined after negotiation between the first network and the second network.

Furthermore, before sending the first message to the first network registered by the first SIM card, the time domain configuration method involved in the present disclosure further includes: requesting a registration of the first SIM card to the first network and requesting a registration of the second SIM card to the second network to which the second SIM card belongs.

The specific implementation of the time domain configuration method applied to the terminal as described above in this disclosure can be referred to the description of the time domain configuration method performed by the terminal in FIGS. 2 to 7, and will not be described in detail herein.

In the time domain configuration method applicable to the terminal according to the embodiments of this disclosure, the terminal can autonomously choose to send message for informing the network registered by the installed SIM card that the terminal is further provided with other SIM card(s), and perform operation based on the time domain configuration information sent by the network to avoid the incorrect response from the network.

Figure 10:
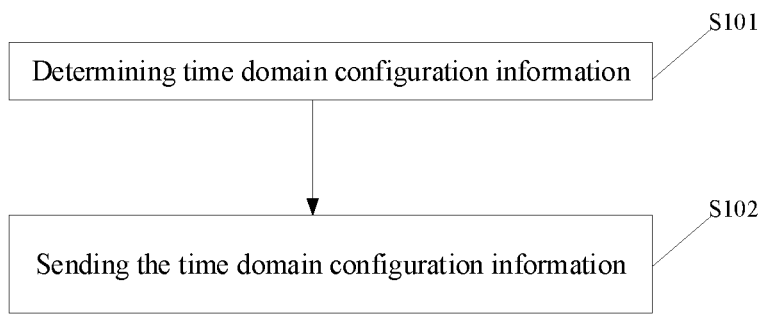
FIG. 10 illustrates yet another flowchart for sending time domain configuration according to some embodiments.

FIG. 10 illustrates yet another flowchart of a time domain configuration method according to some embodiments. As shown in FIG. 10, the time domain configuration method may be applied to an operator network, which may include the following steps S101 and S102.

In step S101, the first time domain configuration information is determined. The first time domain configuration information includes the time domain information used by the terminal for operating in the second network registered by the second SIM card.

In step S102, the first time domain configuration information is sent.

Figure 11:
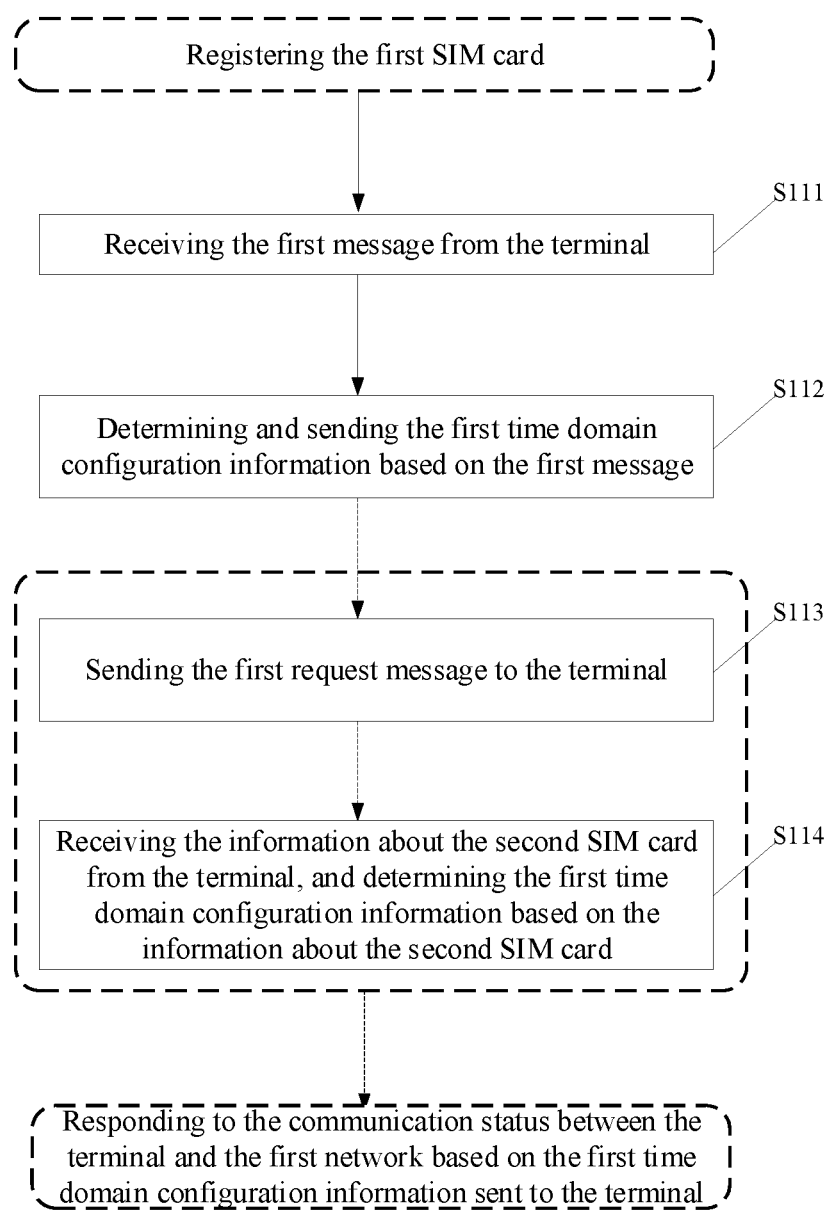
FIG. 11 illustrates yet another flowchart for sending a time domain configuration according to some embodiments.

FIG. 11 illustrates yet another flowchart of a time domain configuration method according to some embodiments. As shown in FIG. 11, the time domain configuration method may be applied to an operator network, which may include the following steps S111 and S112.

In step S111, a first message is received from the terminal, and the first message is used to inform the network registered by the first SIM card installed in the terminal that the terminal is further provided with a second SIM card.

In step S112, the first time domain configuration information is determined and sent based on the first message.

Here, the first SIM card is designated by the terminal; or the first SIM card is selected by the user.

Furthermore, the time domain configuration method applied to the operator network involved in the present disclosure may further include step S113 and step S114 as follows. Step S113 and step S114 are optional.

In step S113, a first request message is sent to the terminal, and the first request message is used to request information about the second SIM card.

In step S114, the information about the second SIM card sent by the terminal based on the user's permission is received and the first time domain configuration information is determined based on the information about the second SIM card.

Here, the first time domain configuration information may also be determined in this disclosure based on the result of the negotiation between the first network and the second network.

Furthermore, in the present disclosure, after sending the first time domain configuration information to the terminal, the operator network may also respond to the communication status between the terminal and the first network based on the first time domain configuration information sent to the terminal.

Furthermore, prior to receiving the first message sent by the terminal, the present disclosure further includes: registering the first SIM card.

In this disclosure, after receiving the message sent by the terminal for informing that the terminal is further provided with other SIM card(s), the operator network can perform time domain configuration, send the time domain configuration information to the terminal, and respond correctly when the terminal performs operation in an operator network registered by another SIM card based on the time domain configuration information.

The specific implementation of the time domain configuration method applied to the operator network involved in this disclosure described above can be referred to the description of the time domain configuration method performed by the network in FIGS. 2 to 7, and will not be detailed herein.

It should be understood that although the operations are depicted in the accompanying drawings in a particular order in these embodiments of the disclosure, it should not be construed as requiring that the operations be performed in the particular order shown or in serial order, or that all of the operations shown be performed to obtain the desired results. Multitasking and parallel processing may be advantageous in particular environments.

Based on the same concept, embodiments of the present disclosure also provide a time domain configuration apparatus.

It should be understood that the time domain configuration apparatus provided by embodiments of the present disclosure contains hardware structures and/or software modules that perform the respective functions in order to achieve the above functions. In combination with the units and algorithmic steps of each example disclosed in embodiments of the present disclosure, the embodiments of the present disclosure can be implemented in the form of hardware or a combination of hardware and computer software. Whether a particular function is performed as hardware or computer software driven hardware depends on the particular application and design constraints of the technical solution. A person skilled in the art may use a different approach for each particular application to implement the described functions, but such implementation should not be considered beyond the scope of the technical solutions of the embodiments of the present disclosure.

Figure 12A:
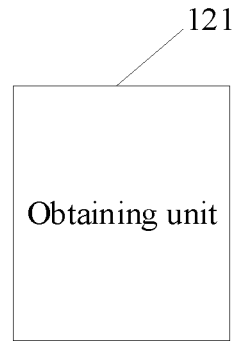
FIG. 12A illustrates a block diagram of a time domain configuration apparatus according to some embodiments.

FIG. 12A illustrates a block diagram of a time domain configuration apparatus 1200 according to some embodiments. The time domain configuration apparatus 1200 may be applied to a terminal, and with reference to FIG. 12A, the time domain configuration apparatus 1200 includes an obtaining unit 121. The obtaining unit 121 is configured to obtain first time domain configuration information from a first network registered by the first SIM card. The first time domain configuration information includes time domain information used by the terminal for operating in a second network registered by a second SIM card.

Figure 12B:
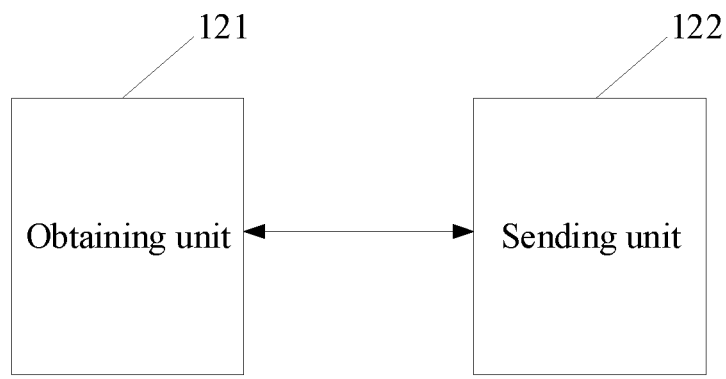
FIG. 12B illustrates a block diagram of another time domain configuration apparatus according to some embodiments.

On the one hand, the time domain configuration apparatus 1200 provided by the present disclosure may further include a sending unit 122, as shown in FIG. 12B. The sending unit 122 is configured to send a first message to the first network registered by the first SIM card, and the first message is used to inform the first network terminal that the terminal is further provided with the second SIM card. The first time domain configuration information is determined by the first network based on the first message.

On the other hand, the obtaining unit 121 is further configured to: obtain second time domain configuration information from the second network registered by the second SIM card. The second time domain configuration information includes time domain information used by the terminal for operating in the first network.

On yet another hand, the time domain configuration apparatus 1200 provided by the present disclosure may further include the sending unit 122, as shown in FIG. 12B. The sending unit 122 is configured to: send a second message to the second network registered by the second SIM card, and the second message is used to inform the second network that the terminal is further provided with the first SIM card. The second time domain configuration information is determined by the second network based on the second message.

Here, the first SIM card is installed in a communication card slot designated by the terminal; or the first SIM card is selected by the user.

On yet another hand, the obtaining unit 121 is further configured to: receive a first request message from the first network, and the first request message is used to request information about the second SIM card. The sending unit 122 is further configured to send, based on a user's permission, the information about the second SIM card to the first network, and the information about the second SIM card is used to determine the first time domain configuration information.

Here, the first time domain configuration information is determined based on a result of a negotiation between the first network and the second network registered by the second SIM card.

Figure 13A:
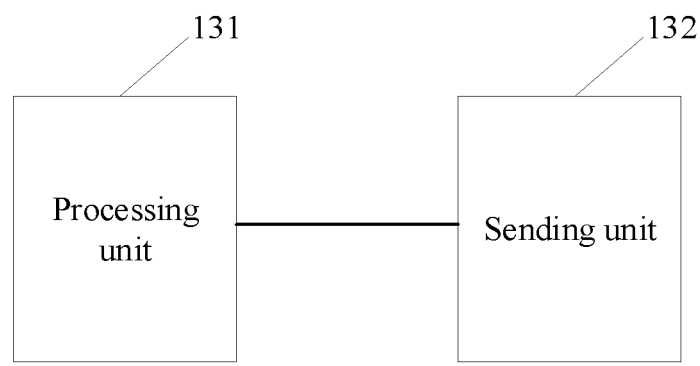
FIG. 13A illustrates a block diagram of yet another time domain configuration apparatus according to some embodiments.

FIG. 13 illustrates a block diagram of a time domain configuration apparatus 1300 according to some embodiments. The time domain configuration apparatus 1300 may be applied to an operator network and, with reference to FIG. 13, the time domain configuration apparatus 1300 includes a processing unit 131 and a sending unit 132. The processing unit 131 is configured to determine first time domain configuration information, and the first time domain configuration information includes the time domain information used by the terminal for operating in the second network registered by the second SIM card. The sending unit 132 is configured to send the first time domain configuration information.

Figure 13B:
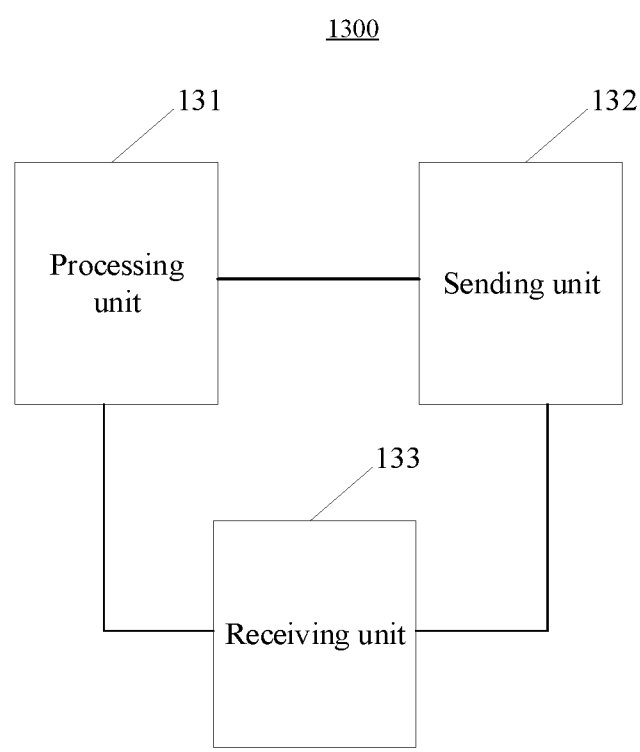
FIG. 13B illustrates a block diagram of yet another time domain configuration apparatus according to some embodiments.

On the one hand, the time domain configuration apparatus 1300 also includes a receiving unit 133, as shown in FIG. 13B.

The receiving unit 133 is configured to receive a first message from the terminal. The first message is used to inform a first network registered by a first SIM card provided at the terminal that the terminal is further provided with the second SIM card. The first time domain configuration information is determined based on the first message.

Here, the first SIM card is designated by the terminal; or the first SIM card is selected by the user.

On the other hand, the sending unit 132 is further configured to send a first request message to the terminal, and the first request message is used to request information about the second SIM card. A receiving unit 133 is configured to receive the information about the second SIM card sent by the terminal based on a user's permission, and determine the first time domain configuration information based on the information about the second SIM card.

Here, the first time domain configuration information is determined based on a result of a negotiation between the first network and the second network registered by the second SIM card.

On yet another hand, the processing unit 131 is further configured to: respond to a communication status between the terminal and the first network based on the first time domain configuration information sent to the terminal.

On yet another hand, the processing unit 131 is also configured to: register the first SIM card before the receiving unit 133 receives the first message from the terminal.

Regarding the apparatus in the above embodiments, the specific way in which each module performs its operation has been described in detail in the embodiments of the time domain configuration method, and will not be described in detail here.

Figure 14:
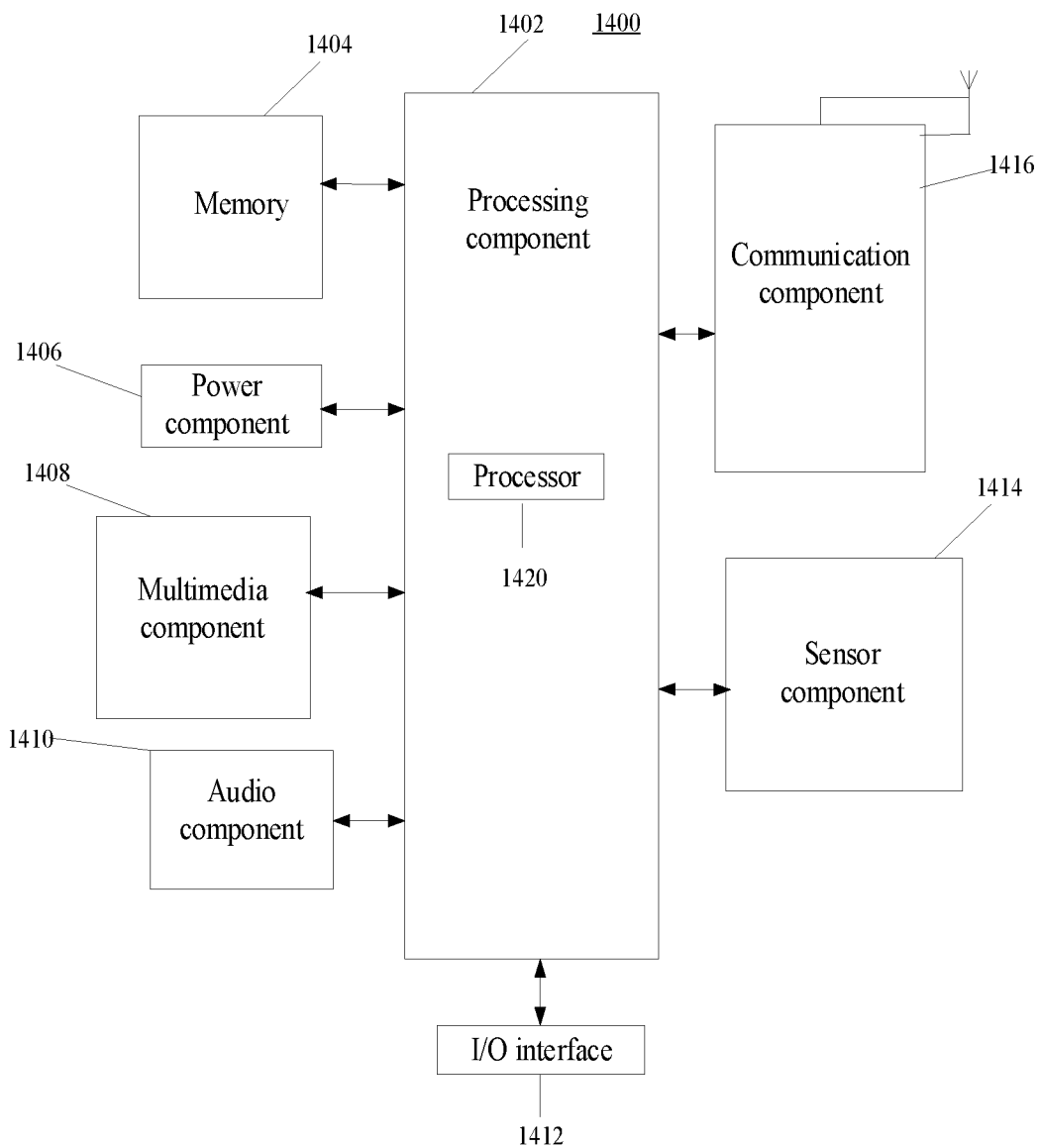
FIG. 14 illustrates a structural block diagram of a time domain configuration device according to some embodiments.

FIG. 14 illustrates a block diagram of a time domain configuration device 1400 according to some embodiments. The time domain configuration device 1400 may be applied to a terminal, for example, the device 1400 may be a cell phone, a computer, a digital broadcast terminal, a message sending and receiving device, a gaming console, a tablet device, a medical device, a fitness device, a personal digital assistant, and the like.

Referring to FIG. 14, the device 1400 may include one or more of the following components: processing component 1402, memory 1404, power component 1406, multimedia component 1408, audio component 1410, interface 1412 for input/output (I/O), sensor component 1414, and communication component 1416.

Processing component 1402 generally controls the overall operation of device 1400, such as operations associated with display, telephone call, data communication, camera operation, and recording operations. Processing component 1402 may include one or more processors 820 to execute instructions to complete all or some of the steps of the method described above. In addition, processing component 1402 may include one or more modules that facilitate interaction between processing component 1402 and other components. For example, processing component 1402 may include a multimedia module to facilitate interaction between multimedia component 1408 and processing component 1402.

Memory 1404 is configured to store various types of data, such as executable instructions for the processor 820, to support operation at device 1400. Examples of such data include instructions for any application or method of operation on device 1400, contact data, phone book data, messages, pictures, videos, etc. Memory 1404 may be implemented by any type of volatile or non-volatile storage device or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, disk, or optical disk.

The power component 1406 provides power to various components of the device 1400. The power component 1406 may include a power management system, one or more power sources, and other components associated with generating, managing, and distributing power for the device 1400.

Multimedia component 1408 includes a screen providing an output interface between the device 1400 and the user. In some embodiments, the screen may include a Liquid Crystal Display (LCD) and a Touch Panel (TP). If the screen includes a touch panel, the screen may be implemented as a touch screen to receive input signals from the user. The touch panel includes one or more touch sensors to sense touches, swipes, and gestures on the touch panel. The touch sensors may not only sense the boundaries of the touch or swipe action, but also detect the duration and pressure associated with the touch or swipe action. In some embodiments, multimedia component 1408 includes a front-facing camera and/or a rear-facing camera. The front camera and/or rear camera can receive external multimedia data when the device 1400 is in an operating mode, such as shooting mode or video mode. Each front camera and rear camera may be a fixed optical lens system or have focal length and optical zoom capability.

The audio component 1410 is configured to output and/or input audio signals. For example, the audio component 1410 includes a microphone (MIC) configured to receive external audio signals when the device 1400 is in an operating mode, such as call mode, record mode, and voice recognition mode. The received audio signal may be further stored in memory 1404 or sent via communication component 1416. In some embodiments, the audio component 1410 further includes a speaker for outputting the audio signal.

The I/O interface 1412 provides an interface between the processing component 1402 and the peripheral interface modules, and the peripheral interface modules may be keypads, click wheels, buttons, etc. These buttons may include, but are not limited to: a home button, a volume button, a start button, and a lock button.

The sensor component 1414 includes one or more sensors for providing a status assessment of various aspects of the device 1400. For example, the sensor component 1414 may detect an open/closed state of the device 1400, relative positioning of components, such as the components being the display and keypad of the device 1400, and the sensor component 1414 may also detect a change in position of the device 1400 or a component of the device 1400, the presence or absence of user contact with the device 1400, orientation or acceleration/deceleration of the device 1400, and temperature changes of the device 1400. The sensor component 1414 may include a proximity sensor configured to detect the presence of nearby objects in the absence of any physical contact. The sensor component 1414 may also include a light sensor, such as a CMOS or CCD image sensor, for use in an imaging application. In some embodiments, the sensor component 1414 may also include an accelerometer sensor, a gyroscope sensor, a magnetic sensor, a pressure sensor, or a temperature sensor.

The communication component 1416 is configured to facilitate communication between the device 1400 and other devices by wired or wireless means. The device 1400 may access a wireless network based on a communication standard, such as WiFi, 2G or 3G, or a combination thereof. In some embodiments, communication component 1416 receives broadcast signals or broadcast-related information from an external broadcast management system via a broadcast channel. In some embodiments, the communication component 1416 further comprises a near-field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology, and other technologies.

In some embodiments, the device 1400 may be implemented by one or more application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, or other electronic components for performing the methods described above.

In some embodiments, there is also provided a non-transitory computer readable storage medium including instructions, such as a memory 1404 including instructions. The above-mentioned instructions are executable by the processor 1420 of the device 1400 to accomplish the method described above. For example, the non-transitory computer readable storage medium may be ROM, random access memory (RAM), CD-ROM, magnetic tape, floppy disk, and optical data storage device, among others.

Figure 15:
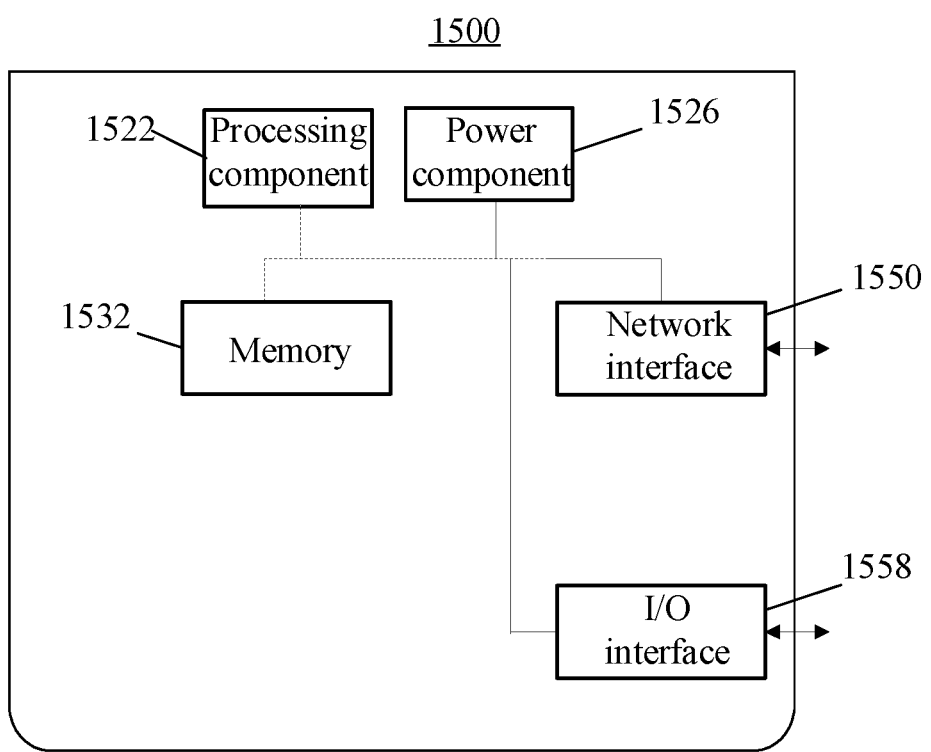
FIG. 15 illustrates a structural block diagram of another time domain configuration device according to some embodiments.

FIG. 15 illustrates a block diagram of a time domain configuration device 1500 according to some embodiments. The device 1500 may be applied to an operator network. For example, the device 1500 may be provided as a network device in an operator network, such as a base station or core network device. Referring to FIG. 15, the device 1500 includes a processing component 1522, which further includes one or more processors and memory resources represented by memory 1532 for storing instructions that may be executed by the processing component 1522, such as application programs. The application programs stored in memory 1532 may include one or more modules each corresponding to a set of instructions. In addition, the processing component 1522 is configured to execute the instructions to perform the time domain configuration method involved above.

The device 1500 may also include a power component 1526 configured to perform power management of the device 1500, a wired or wireless network interface 1550 configured to connect the device 1500 to a network, and an input-output (I/O) interface 1558. An operating system stored in the memory 1532 may be operated on the device 1500, which is e.g., Windows Server™, Mac OS X™, Unix™, Linux™, FreeBSD™, or the like.

In some embodiments, there is also provided a non-transitory computer readable storage medium including instructions, such as a memory 1532 including instructions. The above-mentioned instructions are executable by the processing component 1522 of the device 1500 to accomplish the time domain configuration method described above. For example, the non-transitory computer readable storage medium may be ROM, random access memory (RAM), CD-ROM, magnetic tape, floppy disk, and optical data storage devices, among others.

Embodiments of the present disclosure also provide a communication system including a time domain configuration apparatus 1200 applied to a terminal and a time domain configuration apparatus 1300 applied to an operator network as described above. The functions of the time domain configuration apparatus 1200 and the time domain configuration apparatus 1300 can be referred to the specific description of the above embodiments.

Other embodiments of the present disclosure will easily come to the mind of one skilled in the art upon consideration of the specification and practice of the invention disclosed herein. This disclosure is intended to cover any variation, use, or adaptation of the present disclosure that follows the general principles of the present disclosure and includes commonly known or customary technical means in the art that are not disclosed herein. The specification and embodiments are to be considered exemplary only, and the true scope and spirit of the present disclosure is indicated by the following claims.

It should be understood that the present disclosure is not limited to the precise construction already described above and illustrated in the accompanying drawings, and that various modifications and changes may be made without departing from its scope. The scope of the present disclosure is limited only by the appended claims.

What is claimed is:

1. A time domain configuration method, applied to a terminal provided with a first Subscriber Identification Module (SIM) card and a second SIM card, comprising:
   obtaining first time domain configuration information from a first network registered by the first SIM card, wherein the first time domain configuration information comprises time domain information used by the terminal for operating in a second network registered by the second SIM card;
   wherein the method further comprises:
   obtaining second time domain configuration information from the second network registered by the second SIM card,
   wherein the second time domain configuration information comprises time domain information used by the terminal for operating in the first network.

2. The time domain configuration method of claim 1, wherein before obtaining the first time domain configuration information from the first network registered by the first SIM card, the method further comprises:
   sending a first message to the first network, wherein the first message is used to inform the first network that the terminal is further provided with the second SIM card;
   wherein the first time domain configuration information is determined by the first network based on the first message.

3. The time domain configuration method of claim 2, wherein the first SIM card is installed in a communication card slot designated by the terminal or the first SIM card is selected by a user.

4. The time domain configuration method of claim 1, further comprising:
   sending a second message to the second network registered by the second SIM card, wherein the second message is used to inform the second network that the terminal is further provided with the first SIM card;
   wherein the second time domain configuration information is determined by the second network based on the second message.

5. The time domain configuration method of claim 1, further comprising:
   receiving a first request message from the first network, wherein the first request message is used to request information about the second SIM card; and
   sending, based on a user's permission, the information about the second SIM card to the first network, wherein the information about the second SIM card is used to determine the first time domain configuration information.

6. The time domain configuration method of claim 5, wherein the first time domain configuration information is determined based on a result of a negotiation between the first network and the second network registered by the second SIM card.

7. A time domain configuration method, applied to an operator network, comprising:
   determining first time domain configuration information, wherein the first time domain configuration information comprises time domain information used by a terminal for operating in a second network registered by a second Subscriber Identification Module (SIM) card, and wherein the second network is configured to determine second time domain configuration information that comprises time domain information used by the terminal for operating in the first network; and
   sending the first time domain configuration information.

8. The time domain configuration method of claim 7, further comprising:
   receiving a first message from the terminal, wherein the first message is used to inform a first network registered by a first SIM card provided at the terminal that the terminal is further provided with the second SIM card;
   wherein the first time domain configuration information is determined based on the first message.

9. The time domain configuration method of claim 8, wherein the first SIM card is designed by the terminal or the first SIM card is selected by a user.

10. The time domain configuration method of claim 7, further comprising:
    sending a first request message, wherein the first request message is used to request information about the second SIM card; and
    receiving the information about the second SIM card sent by the terminal based on a user's permission, and determining the first time domain configuration information based on the information about the second SIM card.

11. The time domain configuration method of claim 10, wherein the first time domain configuration information is determined based on a result of a negotiation between the first network registered by the first SIM card and the second network registered by the second SIM card.

12. The time domain configuration method of claim 7, further comprising:
    responding, by the first network registered by the first SIM card, to a communication status between the terminal and the first network based on the first time domain configuration information sent to the terminal.

13. A time domain configuration device, applied to a terminal, comprising:
    a processor; and
    a memory for storing executable instructions of the processor;
    wherein the processor is configured to execute following steps:
    obtaining time domain configuration information from a first network registered by a first Subscriber Identification Module (SIM) card,
    wherein the time domain configuration information comprises time domain information used by the terminal for operating in a second network registered by a second SIM card; and
    wherein the processor is further configured to:
    obtain second time domain configuration information from the second network registered by the second SIM card, wherein the second time domain configuration information comprises time domain information used by the terminal for operating in the first network.

14. The time domain configuration device of claim 13, wherein the processor is further configured to: send a message to the first network, wherein the message is used to inform the first network that the terminal is further provided with the second SIM card;
    wherein the time domain configuration information is determined by the first network based on the message.

15. The time domain configuration device of claim 14, wherein the first SIM card is installed in a communication card slot designated by the terminal or the first SIM card is selected by a user.

16. The time domain configuration device of claim 13, wherein the processor is further configured to:
- receive a request message from the first network, wherein the request message is used to request information about the second SIM card; and
- send, based on a user's permission, the information about the second SIM card to the first network, wherein the information about the second SIM card is used to determine the time domain configuration information.

17. The time domain configuration device of claim 16, where the time domain configuration information is determined based on a result of a negotiation between the first network and the second network registered by the second SIM card.

18. A non-transitory computer-readable storage medium, causing, when instructions stored in the storage medium are executed by a processor of a terminal, the terminal to implement the time domain configuration method of claim 1.

19. A time domain configuration device, applied to an operator network, comprising:
- a processor; and
- a memory for storing executable instructions of the processor;
- wherein the processor is configured to execute the time domain configuration method of claim 7.

* * * * *